(12) United States Patent
Halasa et al.

(10) Patent No.: US 7,291,687 B1
(45) Date of Patent: Nov. 6, 2007

(54) CATALYST SYSTEM FOR SYNTHESIZING RUBBERY POLYMERS HAVING A HIGH TRANS MICROSTRUCTURE CONTENT

(75) Inventors: Adel Farhan Halasa, Bath, OH (US); Laurie Elizabeth Austin, Hartville, OH (US); Wen-Liang Hsu, Cuyahoga Falls, OH (US)

(73) Assignee: The Goodyear Tire and Rubber Company, Akron, OH (US)

( * ) Notice: Subject to any disclaimer, the term of this patent is extended or adjusted under 35 U.S.C. 154(b) by 0 days.

(21) Appl. No.: 11/468,921

(22) Filed: Aug. 31, 2006

(51) Int. Cl.
*C08F 36/04* (2006.01)
*C08F 4/50* (2006.01)

(52) U.S. Cl. .................. 526/183; 526/174; 526/176; 526/180; 526/181; 502/153; 502/154

(58) Field of Classification Search ............... 502/153, 502/154, 155; 526/174, 176, 180, 190, 335, 526/183, 181
See application file for complete search history.

(56) References Cited

U.S. PATENT DOCUMENTS

| | | | |
|---|---|---|---|
| 3,846,385 A | 11/1974 | Hargis et al. | |
| 3,903,019 A | 9/1975 | Hargis et al. | |
| 4,028,484 A | 6/1977 | Morton et al. | |
| 4,503,204 A | 3/1985 | Bingham et al. | |
| 4,555,498 A * | 11/1985 | Kamienski | 502/153 |
| 4,670,502 A | 6/1987 | Hargis et al. | |
| 5,284,927 A | 2/1994 | Hsu et al. | |
| 6,046,266 A * | 4/2000 | Sandstrom et al. | 524/492 |
| 6,103,842 A | 8/2000 | Halasa et al. | |
| 6,627,715 B2 | 9/2003 | Halasa et al. | |
| 6,897,270 B2 | 5/2005 | Ozawa et al. | |
| 6,933,358 B2 | 8/2005 | Halasa et al. | |
| 2005/0181935 A1 | 8/2005 | Halasa et al. | |

* cited by examiner

*Primary Examiner*—Fred Teskin
(74) *Attorney, Agent, or Firm*—Wood, Herron and Evans, L.L.P.

(57) ABSTRACT

The present invention is directed to a catalyst system for synthesizing rubbery polymers, such as polybutadiene rubber and styrene-butadiene rubber, having a high trans microstructure. The catalyst system, in one embodiment, includes (a) a barium salt of an alcohol that is soluble in a hydrocarbon solvent, and (b) an organomagnesium compound. In one example, the alcohol is a primary or secondary alcohol. The catalyst system can further optionally include an alkali metal alkoxide, an organolithium compound, an amine compound, or mixtures thereof.

19 Claims, No Drawings

CATALYST SYSTEM FOR SYNTHESIZING RUBBERY POLYMERS HAVING A HIGH TRANS MICROSTRUCTURE CONTENT

FIELD OF THE INVENTION

The present invention is directed to a catalyst system which includes barium salts of alcohols and an organomagnesium compound for synthesizing rubbery polymers, such as styrene-butadiene rubber and polybutadiene rubber, having a high trans microstructure content that can be utilized in tire tread rubbers.

BACKGROUND OF THE INVENTION

It is desirable for tires to have good wet skid resistance, low rolling resistance, tear strength, and good wear characteristics. It has traditionally been difficult to improve the wear characteristics of a tire without sacrificing wet skid resistance and traction characteristics. These properties depend, to a great extent, on the dynamic viscoelastic properties of the rubbers utilized in making the tire. Such viscoelastic properties are controlled largely by the microstructure of the elastomer.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers that undergo a large energy loss have generally been utilized in the tread of the tire. In order to balance these two viscoelastically inconsistent properties, mixtures of various types of synthetic and natural rubber are normally utilized in tire treads. For instance, various mixtures of styrene-butadiene rubber (SBR) and polybutadiene rubber are commonly used as a rubbery material for automobile tire treads.

It has been conventionally believed to be desirable for styrene-butadiene rubber, when utilized in tire tread compounds, to have a high level of vinyl content (1,2-microstructure). In contrast to providing high vinyl content rubbery polymers, it is believed that rubbery polymers having high trans microstructure contents may provide a more desirable balance of tire tread properties. To this end, the rubbery polymers can be synthesized by solution polymerization that is conducted in the presence of a catalyst system.

Thus, it is desirable to provide catalyst systems for synthesizing rubbery polymers, such as polybutadiene rubber and styrene-butadiene rubber, having a high trans microstructure content, wherein the rubbery polymers can provide desirable wear properties without substantially sacrificing other performance characteristic(s), e.g., traction properties.

SUMMARY OF THE INVENTION

In accordance with an embodiment of the present invention, a catalyst system is provided which includes (a) a barium salt of an alcohol that is soluble in a hydrocarbon solvent, and (b) an organomagnesium compound. In one embodiment, the alcohol is a primary or secondary alcohol, or mixtures thereof. The catalyst system can further optionally include an alkali metal alkoxide, an organolithium compound, an amine compound, or mixtures thereof.

The catalyst system will catalyze the copolymerization of one or more conjugated diolefin monomers with vinyl aromatic monomers into copolymer rubbers, such as styrene-butadiene rubber, having a high trans microstructure content. This catalyst system will also catalyze the polymerization of conjugated diolefin monomers, such as 1,3-butadiene and isoprene, into rubbery polymers having a high trans microstructure content. High trans styrene-butadiene rubber and high trans-1,4-polybutadiene rubber that is synthesized using the catalyst system of this invention is useful in the preparation of tire tread rubber compounds which exhibit improved wear and tear characteristics, such as tread compounds that contain high levels of silica.

By virtue of the foregoing, there is thus provided a catalyst system including a barium salt of an alcohol and an organomagnesium compound for synthesizing rubbery polymers, such as polybutadiene rubber and styrene-butadiene rubber, having a high trans microstructure content, wherein the rubbery polymers provide desirable wear properties without substantially sacrificing other performance characteristic(s), e.g., traction properties.

DETAILED DESCRIPTION

A catalyst system is provided which includes (a) a barium salt of an alcohol that is soluble in a hydrocarbon solvent, and (b) an organomagnesium compound. In one embodiment, the alcohol is a primary or secondary alcohol, or mixtures thereof. The catalyst system can further optionally include an alkali metal alkoxide, an organolithium compound, an amine compound, or mixtures thereof. The catalyst system synthesizes rubbery polymers, such as polybutadiene rubber and styrene-butadiene rubber, having a high trans microstructure content that can be utilized in tire tread rubbers, with the polymerizations typically carried out in a hydrocarbon solvent, as further discussed below in detail.

Barium salts of alcohols are made by reacting an alcohol (s) with barium or another barium source, such as barium hydroxide, in an aliphatic or aromatic solvent. During synthesis, water/hydrogen is released from the alcohol(s), i.e., substituted by barium, to yield the barium salt of the alcoholate, i.e., a barium alkoxide, which may be represented generally by the formula:

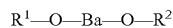

wherein $R^1$ and $R^2$ can be the same or different and represent, for example, alkyl groups (including cycloalkyl groups), aryl groups, alkaryl groups or arylalkyl groups, and heterocyclic alkyl groups. Accordingly, the R groups are defined by the organic group attached to the oxygen atom of the alcohol(s) used in synthesis of the barium alkoxide. The alcohols used in the synthesis of the barium alkoxides can be any suitable primary, secondary, or tertiary alcohol such that the barium alkoxide is soluble in hydrocarbon solvents and other non-polar organic solvents. For example, the alcohol used to make the barium alkoxide may include methanol, ethanol, propanol, isopropanol, n-butanol, cyclopentanol, cycloheptanol, cyclohexanol, s-butanol, t-butanol, allyl alcohol, pentanol, hexanol, octanol, decanol, 2-isopropyl-5-methylcyclohexanol, 2-tert-butyl-5-methylcyclohexanol, menthol, thymol, furfuryl alcohol, tetrahydrofurfuryl alcohol, N-piperidinomethanol, 2-N-piperidinoethanol, N-pyrrolidinomethanol, or 2-N-pyrrolidinoethanol, mixtures of the same, and others known to those having ordinary skill in the art. In one example, the alcohol is a secondary alcohol, a primary alcohol, or mixtures thereof. In another example, the alcohol can be defined by a heterocyclic non-aromatic compound that includes a ring structure with one or more nitrogen atoms or one or more oxygen atoms as part of the ring, the ring structure further substituted by a hydroxy-substituted $C_1$–$C_5$ alkyl group, e.g., methyl or ethyl. The heterocyclic ring may contain from 2 carbon atoms to about 6 carbon atoms. In one example, the heterocyclic ring contains 4 or 5 carbon atoms. Such substituted heterocyclic non-aromatic compounds may include furfuryl alcohol, tetrahydrofurfuryl alcohol, N-piperidinomethanol, 2-N-piperidinoethanol, N-pyrrolidinomethanol, or 2-N-pyrrolidinoethanol.

The reaction for synthesizing the barium alkoxide can be conducted at a temperature of from about −100° C. up to the boiling point of the solvent or above the boiling point under pressure. After the reaction, the solvent can be removed from the salt by distillation, vacuum evaporation, solvent extraction, or other methods known to those having ordinary skill in the art.

The barium alkoxide will normally be present in the polymerization medium in an amount that is within the range of about 0.01 to about 1.5 phm (parts by 100 parts by weight of total monomer). In one example, from about 0.2 phm to about 0.8 phm of the barium alkoxide can be utilized.

The organomagnesium compound of the catalyst system may include any magnesium compound that contains at least one magnesium-carbon bond and that is soluble in a hydrocarbon solvent. In one embodiment, the organomagnesium compound may be a dihydrocarbyl magnesium compound of the general formula $MgR^1R^2$, where $R^1$ and $R^2$ are independently a mono-valent organic group with the organic group typically bound to the magnesium atom through a carbon atom. In one embodiment, $R^1$ and $R^2$ may independently be hydrocarbyl groups such as, but not limited to, an alkyl, cycloalkyl, substituted cycloalkyl, alkenyl, cycloalkenyl, substituted cycloalkenyl, aryl, allyl, substituted aryl, aralkyl, and alkynyl groups, with each hydrocarbyl group having from 1 carbon atom to about 20 carbon atoms. In another embodiment, the hydrocarbyl group may contain at least one heteroatom such as, but not limited to, boron, nitrogen, oxygen, silicon, sulfur, and phosphorus. In one example, the dihydrocarbyl magnesium compound can include diethylmagnesium, di-n-propylmagnesium, diisopropylmagnesium, dibutylmagnesium, dihexylmagnesium, diphenylmagnesium, dibenzylmagnesium, and mixtures thereof. In another example, the dihydrocarbyl magnesium compound is a dialkyl magnesium compound, such as diethylmagnesium, di-n-propylmagnesium, diisopropylmagnesium, dibutylmagnesium, and others known to those having ordinary skill in the art.

In another embodiment, the organomagnesium compound may be a compound represented by the general formula $R^3MgX$, where $R^3$ may be a mono-valent hydrocarbyl group with the organic group typically bound to the magnesium atom through a carbon atom and where X may be a hydrogen atom, a halogen atom, a carboxylate group, an alkoxide group, or an aryloxide group. In one example, $R^3$ may be a hydrocarbyl group such as, but not limited to, an alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group having from 1 carbon atom to about 20 carbon atoms. In one example, the hydrocarbyl group $R^3$ may contain at least one heteroatom such as, but not limited to, nitrogen, oxygen, boron, silicon, sulfur, and phosphorus. In one example, X may be a carboxylate group, an alkoxide group, or an aryloxide group having from 1 carbon atom to about 20 carbon atoms.

Specific examples of organomagnesium compounds having the general formula $R^3MgX$ may include, but are not limited to, methylmagnesium hydride, ethylmagnesium hydride, butyl magnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and mixtures thereof.

The molar ratio of the organomagnesium compound to the barium alkoxide will typically be within the range of about 0.1:1 to about 20:1. In one example, the molar ratio is within the range of 0.5:1 to about 15:1. In another example, the molar ratio of the organomagnesium compound to the barium alkoxide is within the range of about 1:1 to about 6:1. In yet another example, the molar ratio is within the range of about 1:1 to about 4:1.

The organomagnesium compound will normally be present in the polymerization medium in an amount that is within the range of about 0.01 to about 1.5 phm (parts by 100 parts by weight of total monomer). In one example, from about 0.01 phm to about 1.2 phm of the organomagnesium compound can be utilized.

The catalyst system may further optionally include a group Ia (alkali earth) metal alkoxide. The group Ia metal alkoxide compound has a general formula M—O—R, where M may be a group Ia metal selected from lithium, sodium, potassium, rubidium, or cesium and R may be an alkyl group, a cycloalkyl group, an aryl group, an alkaryl group, an arylalkyl group, or a heterocyclic alkyl group. In one embodiment, the group Ia metal is sodium, potassium, rubidium, or cesium. In another embodiment, the group Ia metal is sodium or potassium. In another embodiment, the R group may have from 1 to about 12 carbon atoms. In yet another embodiment, the R group may have from about 3 to about 8 carbon atoms.

As with the barium alkoxide, the R group is defined by the organic group attached to the oxygen atom of the alcohol used in synthesis of the group Ia metal alkoxide. The alcohols used can be any suitable primary, secondary, or tertiary alcohol that typically is soluble in hydrocarbon solvents and other non-polar organic solvents. For example, the alcohol can include methanol, ethanol, propanol, isopropanol, n-butanol, cyclopentanol, cycloheptanol, cyclohexanol, s-butanol, t-butanol, allyl alcohol, pentanol, hexanol, octanol, decanol, 2-isopropyl-5-methylcyclohexanol, 2-tert-butyl-5-methylcyclohexano, menthol, thymol, furfuryl alcohol, tetrahydrofurfuryl alcohol, N-piperidinomethanol, 2-N-piperidinoethanol, N-pyrrolidinomethanol, or 2-N-pyrrolidinoethanol mixtures of the same, and others known to those having ordinary skill in the art.

Some representative examples of group I metal alkoxides that can be used in the present invention may include, but are not limited to, lithium methoxide, lithium ethoxide, lithium isopropoxide, lithium n-butoxide, lithium sec-butoxide, lithium t-butoxide, lithium 1,1-dimethylpropoxide, lithium 1,2-dimethylpropoxide, lithium 1,1-dimethylbutoxide, lithium 1,10-dimethylpentoxide, lithium 2-ethylhexanoxide, lithium 1-methylheptoxide, lithium phenoxide, lithium p-methylphenoxide, lithium p-octylphenoxide, lithium p-nonylphenoxide, lithium p-dodecylphenoxide, lithium alpha-naphthoxide, lithium beta-naphthoxide, lithium o-methoxyphenoxide, lithium o-methoxyphenoxide, lithium m-methoxyphenoxide, lithium p-methoxyphenoxide, lithium o-ethoxyphenoxide, lithium 4-methoxy-1-naphthoxide, lithium 2,2-dimethylbutoxide, sodium methoxide, sodium ethoxide, sodium isopropoxide, sodium n-butoxide, sodium sec-butoxide, sodium t-butoxide, sodium 1,1-dimethylpropoxide, sodium 1,2-dimethylpropoxide, sodium 1,1-dimethylbutoxide, sodium 1,10-dimethylpentoxide, sodium 2-ethylhexanoxide, sodium 1-methylheptoxide, sodium phenoxide, sodium p-methylphenoxide, sodium p-octylphenoxide, sodium p-nonylphenoxide, sodium p-dodecylphenoxide, sodium alpha-naphthoxide, sodium beta-naphthoxide, sodium o-methoxyphenoxide, sodium o-methoxyphenoxide, sodium m-methoxyphenoxide, sodium p-methoxyphenoxide, sodium o-ethoxyphenoxide, sodium 4-methoxy-1-naphthoxide, sodium 2,2-dimethylbutoxide, potassium methoxide, potassium ethoxide, potassium isopropoxide, potassium n-butoxide, potassium sec-butoxide, potassium t-butoxide, potassium 1,1-dimethylpropoxide, potassium 1,2-dimethylpropoxide, potassium 1,1-dimethylbutoxide, potassium 1,10-dimethylpentoxide, potassium 2-ethylhexanoxide, potassium 1-methylheptoxide, potassium phenoxide, potassium p-methylphenoxide, potassium p-octylphenoxide, potassium p-nonylphenoxide, potassium p-dodecylphenoxide, potassium α-naphthoxide, potassium beta-naphthoxide, potassium o-methoxyphenoxide, potassium o-methoxyphenoxide, potassium m-methoxyphenoxide, potassium p-methoxyphenoxide, potassium o-ethoxyphenoxide, potassium 4-methoxy-1-naphthoxide, potassium 2,2-dimethylbutoxide, and others known to those having ordinary skill in the art.

The molar ratio of the group Ia metal alkoxide to the barium alkoxide will typically be within the range of about 0.1:1 to about 20:1. In one example, the molar ratio is within the range of 0.5:1 to about 15:1. In another example, the molar ratio of the group Ia metal alkoxide to the barium alkoxide is within the range of about 1:1 to about 6:1. In yet another example, the molar ratio is within the range of about 1:1 to about 4:1.

The group Ia metal alkoxide will normally be present in the polymerization medium in an amount that is within the range of about 0.01 to about 1.5 phm (parts by 100 parts by weight of total monomer). In one example, from about 0.01 phm to about 1.2 phm of the group Ia metal alkoxide can be utilized.

The catalyst system may also further optionally include an organolithium compound. The organolithium compounds of the catalyst system can include the monofunctional and multifunctional initiator types known for polymerizing the conjugated diolefin monomers. The multifunctional organolithium initiators can be either specific organolithium compounds or can be multifunctional types that are not necessarily specific compounds but rather represent reproducible compositions of regulable functionality. The organolithium initiator can also be a functionalized compound.

The choice of initiator can be governed by the degree of branching and the degree of elasticity desired for the polymer, the nature of the feedstock, and the like. With regard to the feedstock employed as the source of conjugated diene, for example, the multifunctional initiator types generally are selected when a low concentration diene stream is at least a portion of the feedstock since some components present in the unpurified low concentration diene stream may tend to react with carbon lithium bonds to deactivate the activity of the organolithium compound, thereby necessitating the presence of sufficient lithium functionality so as to override such effects.

The multifunctional organolithium compounds which can be used include those prepared by reacting an organomonolithium compounded with a multivinylphosphine or with a multivinylsilane, such a reaction typically being conducted in an inert diluent, such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound after reaction of the primary components. Alternatively, the reaction can be conducted in the presence of a minor amount of the solubilizing monomer. The relative amounts of the organomonolithium compound and the multivinylsilane or the multivinylphosphine generally should be in the range of about 0.33 to 4 moles of organomonolithium compound per mole of vinyl groups present in the multivinylsilane or multivinylphosphine employed. It is noted that such multifunctional initiators are commonly used as mixtures of compounds rather than as specific individual compounds.

The organomonolithium compounds can include ethyl lithium, isopropyl lithium, n-butyllithium, sec-butyllithium, n-heptyllithium, tert-octyl lithium, n-eicosyl lithium, phenyl lithium, 2-naphthyllithium, 4-butylphenyllithium, 4-tolyllithium, 4-phenylbutyllithium, cyclohexyl lithium, and others known to those having ordinary skill in the art.

The multivinylsilane compounds can include tetravinylsilane, methyltrivinyl silane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and others known to those having ordinary skill in the art.

The multivinylphosphine compounds can include trivinylphosphine, methyldivinylphosphine, dodecyldivinylphosphine, phenyldivinylphosphine, cyclooctyldivinylphosphine, and others known to those having ordinary skill in the art.

Other multifunctional polymerization initiators can be prepared by utilizing an organomonolithium compound further in combination with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive, and then adding the multivinyl aromatic compound. Any of the conjugated dienes or monovinyl aromatic compounds described can be employed. The ratio of conjugated diene or monovinyl aromatic compound additive employed, in one example, should be in the range of about 2 to 15 moles of polymerizable compound per mole of organolithium compound. The amount of multivinylaromatic compound employed, in one example, should be in the range of about 0.05 to 2 moles per mole of organomonolithium compound.

The multivinyl aromatic compounds can include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and others known to those having ordinary skill in the art. In one example, the multivinyl aromatic compound includes a divinyl aromatic hydrocarbon containing up to 18 carbon atoms per molecule. In another example, the divinyl aromatic hydrocarbon can include divinylbenzene, as either the ortho, meta or para isomer, commercial divinylbenzene, which is a mixture of the three isomers, or other compounds such as the ethyl styrenes.

Other types of multifunctional lithium compounds can be used, such as those prepared by contacting a sec- or tert-organomonolithium compound with 1,3-butadiene, at a ratio of about 2 to 4 moles of the organomonolithium compound per mole of the 1,3-butadiene, in the absence of added polar material, with the contacting, for example, being conducted in an inert hydrocarbon diluent. In another example, the contacting is conducted without the diluent.

Alternatively, specific organolithium compounds can be used as initiators, if desired, in the preparation of the rubbery polymers. These can be represented by R(Li)$_x$ wherein R represents a hydrocarbyl radical containing from 1 to 20 carbon atoms, and wherein x is an integer of 1 to 4. The organolithium compounds can include methyl lithium, isopropyl lithium, n-butyllithium, sec-butyllithium, hexyllithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and others known to those having ordinary skill in the art.

The organolithium compound can be an alkylsilyloxy protected functional lithium compound as described in U.S. Provisional Application Ser. No. 60/234,686. The teachings of U.S. Provisional Application Ser. No. 60/234,686 are incorporated herein by reference. For instance, the initiator can be an alkylsilyloxy protected functional lithium initiator of the structural formula:

wherein X represents a group IVa element selected from carbon, germanium, or tin; wherein R represents alkyl groups that can be the same or different and that contain from 1 to about 8 carbon atoms; and wherein A represents an alkylene group; or:

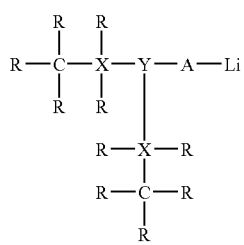

wherein X represents a group IVa element selected from carbon, germanium, or tin; wherein Y represents oxygen, phosphorous, or nitrogen; wherein R represents alkyl groups that can be the same or different and that contain from 1 to about 8 carbon atoms; and wherein A represents an alkylene group; or (c):

wherein R represents alkyl groups that can be the same or different and that contain from 1 to about 8 carbon atoms, and wherein A represents an alkylene group. The alkylene group can be straight chained or branched. For instance, A can represent a straight chained alkylene group of the structural formula —(CH$_2$)$_n$— or it can represent a branched alkylene group, such as:

—[—CH$_2$—CR$_2$—CH$_2$—]— wherein R represents alkyl groups that can be the same or different and that contain from 1 to about 8 carbon atoms. In one example, R represents an alkyl group containing from 1 to about 4 carbon atoms. In another example, R represents methyl groups.

The alkylsilyloxy protected functional lithium initiator will typically be of the structural formula:

wherein X represents a group IVa element selected from carbon, silicon, germanium, or tin; wherein n represents an integer from 1 to 10; wherein R represents alkyl groups that can be the same or different and that contain from 1 to about 8 carbon atoms; or an alkylsilyloxy protected functional lithium compound of the structural formula:

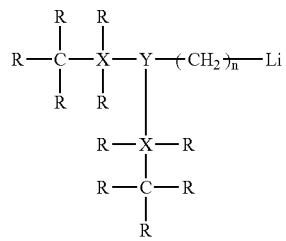

wherein X represents a group IVa element selected from carbon, silicon, germanium, or tin; wherein Y represents oxygen, phosphorous, or nitrogen; wherein n represents an integer from 1 to 10; wherein R represents alkyl groups that can be the same or different and that contain from 1 to about 8 carbon atoms. These rubbery polymers will accordingly normally contain a "living" lithium chain end.

In another example, the alkylsilyloxy protected functional lithium initiator may be of the structural formula:

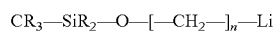

wherein n represents an integer from 1 to 10, and wherein R represents alkyl groups that can be the same or different and that contain from 1 to about 8 carbon atoms.

The molar ratio of the organolithium compound to the barium alkoxide will typically be within the range of about 0.1:1 to about 20:1. In one example, the molar ratio is within the range of 0.5:1 to about 15:1. In another example, the molar ratio of the organolithium compound to the barium alkoxide is within the range of about 1:1 to about 6:1. In yet another example, the molar ratio is within the range of about 1:1 to about 4:1.

The organolithium compound will normally be present in the polymerization medium in an amount that is within the range of about 0.01 to about 1.5 phm (parts by 100 parts by weight of total monomer). In one example, from about 0.01 phm to about 1.2 phm of the organolithium compound can be utilized. In another example, from about 0.025 phm to about 0.07 phm of the organolithium compound in the polymerization medium can be utilized.

The catalyst system may also further optionally include an amine, which can include any suitable amine compound. In one embodiment, the amine compound can be selected from (1) a heterocyclic aromatic or non-aromatic compound which includes a ring structure with one or more nitrogen atoms as part of the ring; (2) an aromatic compound including a ring structure substituted with at least one amino group and at least one polar functionality containing group selected from a carboxyl group or a hydroxyl group; (3) a diamine compound; or (4) an aliphatic amine which includes a $C_1$–$C_{20}$ alkyl group.

The heterocyclic aromatic compounds, which are defined by a ring structure with one or more nitrogen atoms as part of the ring, can include, for example, substituted or unsubstituted 3-, 4-, 5-, or 6-membered ring structures with one or more nitrogen atoms as part of the ring. These compounds may include fused ring structures. Examples of the heterocyclic aromatic compounds can include pyrrole, quinoline, pyridine, 2-picoline, 3-picoline, 4-picoline, pyridazine, pyrimidine, pyrazine, and others known to those having ordinary skill in the art.

The heterocyclic non-aromatic compounds, which are defined by a ring structure with one or more nitrogen atoms as part of the ring, can include, for example, substituted or unsubstituted 3-, 4-, 5-, or 6-membered ring structures with one or more nitrogen atoms as part of the ring. These compounds may include fused ring structures. Examples of the heterocyclic non-aromatic compounds can include pyrolidine, piperidine, piperazine, N,N-dimethyl piperazine, N-methyl piperazine, and others known to those having ordinary skill in the art.

The aromatic compounds, which are defined by a ring structure substituted with at least one amine and at least one polar functionality containing group selected from a carboxyl group or a hydroxyl group, can include, for example, 3-, 4-, 5-, or 6-membered substituted rings, such substitution including at least one amino group and at least one polar functionality containing group selected from a carboxyl group or a hydroxyl group. In one example, the amine is a primary amine. These compounds also may include fused ring structures. Examples of the aromatic compound may include para-aminobenzoic acid (PABA), para-aminophenol (AP), as well as others known to those having ordinary skill in the art.

The diamine compounds can include aliphatic diamines or bicyclic chelating diamine compounds. The bicyclic chelating diamine compounds generally may be defined as two fused rings with at least one ring including two nitrogen atoms. For example, the bicyclic chelating diamine compound may include 1,4-diazabicyclo[2.2.2]octane (DABCO) and others known to those having ordinary skill in the art. The aliphatic diamines can include primary, secondary, or tertiary amines, or combinations thereof. In one example, the aliphatic diamine is an aliphatic bis-primary diamine, such as ethylene diamine or 1,3-diaminopropane. In yet another embodiment, the aliphatic diamines is an aliphatic bis-tertiary diamine, such as N,N,N',N'-tetramethylethylene diamine ("TMEDA").

The aliphatic amines, i.e., monoamines, which include a $C_1$–$C_{20}$ alkyl group, can include a primary, secondary, or tertiary amine. In one example, the aliphatic amine is a primary amine, such as octyl amine, n-butyl amine, or others known to those having ordinary skill in the art.

The molar ratio of the amine compound to the barium alkoxide is within the range of about 0.1:1 to about 20:1. In another example, the molar ratio is from about 0.5:1 to about 15:1. In another example, the molar ratio of the amine compound to the barium alkoxide is within the range of about 1:1 to about 8:1. In yet another example, the molar ratio is within the range of about 1:1 to about 6:1.

The amine compound will normally be present in the polymerization medium in an amount, which is within the range of about 0.20 to about 8.00 phm (parts by 100 parts by weight of total monomer).

Coupling agents also can be used when synthesizing the rubbery polymers to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and others known to those having ordinary skill in the art. In one example, the divinylaromatic hydrocarbons are used, such as divinylbenzene, in either its ortho, meta or para isomer. In another example, commercial divinylbenzene, which is a mixture of the three isomers and other compounds, is used.

While any multiepoxide can be used, in one example, liquids are used since they are more readily handled and form a relatively small nucleus for the radial polymer. In another example, the multiepoxides are epoxidized hydrocarbon polymers, such as epoxidized liquid polybutadienes. In another example, epoxidized vegetable oils, such as epoxidized soybean oil and epoxidized linseed oil, are used. In yet another example, the epoxy compound includes 1,2,5,6,9,10-triepoxydecane, and others known to those having ordinary skill in the art.

Examples of suitable multiisocyanates include benzene-1,2,4-triisocyanate, naphthalene-1,2,5,7-tetraisocyanate, and others known to those having ordinary skill in the art. In one example, the multiisocyanate is a commercially available product known as PAPI-1, which is a polyarylpolyisocyanate having an average of three isocyanate groups per molecule and an average molecular weight of about 380. Such a compound can be visualized as a series of isocyanate-substituted benzene rings joined through methylene linkages.

The multiimines, which are also known as multiaziridinyl compounds, can include those compounds containing three or more aziridine rings per molecule. Examples of such compounds include the triaziridinyl phosphine oxides or sulfides, such as tri(1-ariridinyl)phosphine oxide, tri(2-methyl-1-ariridinyl)phosphine oxide, tri(2-ethyl-3-decyl-1-ariridinyl)phosphine sulfide, and others known to those having ordinary skill in the art.

The multialdehydes can include 1,4,7-naphthalene tricarboxyaldehyde, 1,7,9-anthracene tricarboxyaldehyde, 1,1,5-pentane tricarboxyaldehyde and similar multialdehyde containing aliphatic and aromatic compounds. The multiketones can include 1,4,9,10-anthraceneterone, 2,3-diacetonylcyclohexanone, and others known to those having ordinary skill in the art. Examples of the multianhydrides include pyromellitic dianhydride, styrene-maleic anhydride copolymers, and others known to those having ordinary skill in the art. Examples of the diesters and multiesters include diethyladipate, triethyl citrate, 1,3,5-tricarbethoxybenzene, diethyl phathalate, ethyl benzoate, and others known to those having ordinary skill in the art.

The multihalides can include silicon tetrahalides (such as silicon tetrachloride, silicon tetrabromide and silicon tetraiodide) and the trihalosilanes, (such as trifluorosilane, trichlorosilane, trichloroethylsilane, tribromobenzylsilane and the like). In another example, the multihalide can include multihalogen-substituted hydrocarbons, such as 1,3,5-tri(bromomethyl) benzene, 2,4,6,9-tetrachloro-3,7-decadiene, and others known to those having ordinary skill in the art, in which the halogen is attached to a carbon atom which is alpha to an activating group, such as an ether linkage, a carbonyl group or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and others known to those having ordinary skill in the art.

In addition to the silicon multihalides as described hereinabove, other metal multihalides, such as those of tin, lead or germanium, also can be readily employed as coupling and branching agents. Difunctional counterparts of these agents also can be employed, whereby a linear polymer rather than a branched polymer results. Mixed coupling agents containing both silicon multihalides and tin multihalides can also be used.

In one embodiment, a range of about 0.01 to 4.5 milliequivalents of coupling agent are employed per 100 grams of monomer. In one example, about 0.01 to about 1.5 milliequivalents of the coupling agent per 100 grams of monomer is used to obtain the desired Mooney viscosity. Larger quantities tend to result in production of polymers containing terminally reactive groups or insufficient coupling. One equivalent of treating agent per equivalent of lithium is considered optimum amount for maximum branching, if this result is desired in the production line. The coupling agent can be added in the hydrocarbon solution (e.g., in cyclohexane) to the polymerization admixture in the final reactor with suitable mixing for distribution and reaction.

As discussed above, the catalyst system, which includes the barium salts of alcohol, i.e., the barium alkoxide, that is soluble in a hydrocarbon solvent, and (b) an organomagnesium compound, synthesizes rubbery polymers, such as polybutadiene rubber and styrene-butadiene rubber, having a high trans microstructure content that can be utilized in tire tread rubbers. The rubber polymers can be synthesized from conjugated diolefin monomers, such as 1,3-butadiene, isoprene, 2,3-dimethylbutadiene, and vinyl aromatic monomers, such as vinyl, divinyl, or trivinyl benzene monomers, including styrene, α-methyl styrene, p-tertiary-butyl styrene, methyl vinyl toluene, p-vinyl toluene. In one example, the monomer is 1,3 butadiene. In another example, the monomers include 1,3 butadiene and styrene. For purposes herein, a rubbery polymer includes a high trans microstructure content if the trans microstructure content, e.g., trans 1,4 polybutadiene, of a polymerized conjugated diolefin monomer, such as 1,3 butadiene, is greater than 60% of its total microstructure content.

The polymerizations are typically carried out in a hydrocarbon solvent, such as one or more aromatic, paraffinic or cycloparaffinic compounds. The solvents generally will contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, and petroleum naphtha, alone or in admixture. In the solution polymerizations, there typically will be from 5 to 30 weight percent monomers in the polymerization medium. Such polymerization media are comprised of the organic solvent and monomers. In another example, the polymerization medium may contain from 10 to 25 weight percent monomers. In yet another example, the polymerization medium can contain 15 to 20 weight percent monomers.

The solution styrene-butadiene rubbers made utilizing the catalyst system include repeat units that are derived from the conjugated diolefin monomers and optionally vinyl aromatic monomers, such as styrene. The styrene-butadiene rubbers will typically contain from about 2 weight percent to about 50 weight percent styrene and from about 50 weight percent to about 98 weight percent 1,3-butadiene. However, in some cases, the amount of styrene included will be as low as about 1 weight percent. In another example, the styrene-butadiene rubbers will contain from about 3 weight percent to about 30 weight percent styrene and from about 70 weight percent to about 97 weight percent 1,3-butadiene. In another example, the styrene-butadiene rubbers will contain from about 3 weight percent to about 25 weight percent styrene and from about 75 weight percent to about 97 weight percent 1,3-butadiene.

Styrene-butadiene copolymer resins containing from about 50 weight percent to about 95 weight percent styrene and from about 5 weight percent to about 50 weight percent 1,3-butadiene can also be synthesized using the catalyst system. Such copolymers having glass transition temperatures within the range of 7° C. to 70° C. can be used as toner resins.

In the styrene-butadiene rubbers containing less than about 30 weight percent bound styrene, the distribution of repeat units derived from styrene and butadiene is essentially random. The term "random" as used herein means that less than 10 percent of the total quantity of repeat units derived from styrene are in blocks containing more than five styrene repeat units. In other words, more than 90 percent of the repeat units derived from styrene are in blocks containing five or fewer repeat units. About 20% of the repeat units derived from styrene will be in blocks containing only one styrene repeat unit. Such blocks containing one styrene repeat unit are bound on both sides by repeat units that are derived from 1,3-butadiene.

In styrene-butadiene rubbers containing less than about 20 weight percent bound styrene, less than 4 percent of the total quantity of repeat units derived from styrene are in blocks containing five or more styrene repeat units. In other words, more than 96 percent of the repeat units derived from styrene are in blocks containing less than five repeat units. In such styrene-butadiene rubbers, over 25 percent of repeat units derived from styrene will be in blocks containing only one styrene repeat unit, over 60 percent of the repeat units derived from styrene will be in blocks containing less than 3 repeat units, and over 90 percent of the repeat units derived from styrene will be in blocks containing 4 or fewer repeat units.

In styrene-butadiene rubbers containing less than about 10 weight percent bound styrene, less than 1 percent of the total quantity of repeat units derived from styrene are in blocks containing 5 or more styrene repeat units. In other words, more than 99 percent of the repeat units derived from styrene are in blocks containing 4 or less repeat units. In such styrene-butadiene rubbers, at least about 50 percent of repeat units derived from styrene will be in blocks containing only one styrene repeat unit and over about 85 percent of the repeat units derived from styrene will be in blocks containing less than 3 repeat units.

The styrene-butadiene copolymers also tend to have a consistent composition throughout their polymer chains. In other words, the styrene content of the polymer will be about the same from the beginning to the end of the polymer chain. In one example, no segments of at least 100 repeat units within the polymer will have a styrene content which differs from the total styrene content of the polymer by more than about 10 percent. In another example, such styrene-butadiene copolymers will contain no segments having a length of at least 100 repeat units that have a styrene content which differs from the total styrene content of the polymer by more than about 5 percent. Additionally, the styrene-butadiene copolymers of this invention having bound styrene contents of up to at least about 42 percent are soluble in mixed hexane solvents.

The polymerizations of this invention are initiated by adding the catalyst system, which includes (a) a barium salt of an alcohol, i.e., a barium alkoxide, that is soluble in a hydrocarbon solvent, and (b) an organomagnesium compound, to a polymerization medium, or premix, containing the monomers to be polymerized. In one embodiment, the barium alkoxide is a barium salt of a primary or secondary alcohol. In other embodiments, the catalyst system may optionally include an alkali metal alkoxide, an organolithium compound, an amine compound, or mixtures thereof. The catalyst system may be added to the premix in any desired amount. In one example, the catalyst system is provided in an amount of about 0.100 mmole to about 0.900 mmol/per 100 parts by weight of total monomer. In another example, the catalyst system is provided in an amount of about 0.200 mmole to about 0.700 mmol/per 100 parts by weight of total monomer. The polymerizations can be carried out utilizing batch, semi-continuous or continuous techniques, as known to those having ordinary skill in the art.

The polymerization is conducted for a length of time sufficient to permit substantially complete polymerization of monomers. In other words, the polymerization is normally carried out until high conversions are attained. The polymerization temperature utilized can vary over a broad temperature range of from about 20° C. to about 180° C. In another example, a temperature within the range of about 40° C. to about 120° C. can be utilized. In yet another example, the polymerization temperature can be within the range of about 70° C. to about 100° C. The pressure used will normally be sufficient to maintain a substantially liquid phase under the conditions of the polymerization reaction.

After the polymerization or copolymerization has been completed, the styrene-butadiene rubber, for example, can be recovered from the organic solvent. The rubbery polymer, such as styrene-butadiene rubber, can be recovered from the organic solvent and residue by means such as decantation, filtration, centrification, and others known to those having ordinary skill in the art. It can be desirable to precipitate the polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" or terminates the living polymer by inactivating lithium end groups. The polymerization can also be terminated with other conventional noncoupling types of terminators, such as water, an acid, or with a coupling agent, for example. After the polymer is recovered from the solution, steam-stripping can be employed to reduce the level of volatile organic compounds in the rubber.

There are certain benefits in tire tread compounds derived from the rubbery polymers made with the catalyst systems of the present invention. For example, synthesized styrene-butadiene rubber can be blended with natural rubber to make tread compounds for passenger tires that exhibit desirable rolling resistance, traction, tear, and tread wear characteristics. In cases where tread wear is of great importance, high cis-1,4-polybutadiene can also be included in the blend. In any case, the styrene-butadiene rubbers of this invention can be used to improve the traction, tread wear, and rolling resistance of tires made therewith.

Non-limiting examples of the catalyst system in accordance with the description are now disclosed below. These examples are merely for the purpose of illustration and are not to be regarded as limiting the scope of the invention or the manner in which it can be practiced. Other examples will be appreciated by a person having ordinary skill in the art. Unless specifically indicated otherwise, parts and percentages are given by weight.

Preparation of Barium Salt of Tetrahydrofurfuryl Alcohol

2 L ethyl benzene and 2 mmol of tetrahydrofurfuryl alcohol (THFA) were added to a 3 ml round bottom flask under nitrogen, then heated to reflux with constant stirring. 1 mol barium hydroxide (BaOH) was gradually added to the mixture. The reaction was allowed to proceed until 2 moles water was removed to yield a barium salt of tetrahydrofurfuryl alcohol (BaTHFA), i.e., bis-tetrahydrofurfuryl alcohol barium salt. Instead of THFA, this same procedure may be performed using furfuryl alcohol, N-piperidinomethanol, 2-N-piperidinoethanol, N-pyrrolidinomethanol, or 2-N-pyrrolidinoethanol, for example.

EXAMPLE 1

400 ml of distilled hexane was added to a 28 oz. pop bottle, which was then purged with a nitrogen stream to remove residual oxygen. 200 ml of a 1 M solution of the barium salt of tetrahydrofurfuryl alcohol (BaTHFA) in ethyl benzene, prepared as per the procedure above, was then added to the hexane, followed by 400 mmol of a dialkyl magnesium compound of the general formula $MgR^1R^2$, where $R^1$ and $R^2$ are independently n-butyl and sec-butyl, respectively. The solution was heated in a constant bath to 70° C. to yield a red-colored catalyst system (BaTHFA/$MgR_2$). The molar ratio of BaTHFA to $MgR_2$ was about 1:3.

2000 g of a hexane solution containing 20% by weight styrene and 80% by weight 1,3 butadiene was charged to a one gallon stainless steel reactor equipped with an air-driven motor, a nitrogen inlet, and internal heating/cooling coils for temperature regulation, then heated to 70° C. The catalyst system (BaTHFA/$MgR_2$) was added to the hexane solution to commence the polymerization reaction and in a ratio of 1.00 mmol per 100 g of the monomer to achieve the desired molecular weight. The polymerization reaction was monitored using gas chromatography ("GC") to detect for the presence of unreacted monomers. The polymerization reaction was quenched after about 98% of the monomers were converted and the rubbery polymer stabilized with a phenolic antioxidants. The rubbery polymer was recovered and fully characterized using differential scanning calorimeter (DSC), nuclear magnetic resonance (NMR), and gel permeation chromatography (GPC).

The styrene-butadiene produced was determined to have a glass transition temperature (Tg) at −77° C. and a melting temperature (Tm) at +30° C. The Mooney viscosity (ML-4) at 100° C. was 91. The GPC measurements indicated that the polymer has a number average molecular weight (Mn) of 250,400 g/mol and a weight average molecular weight (Mw) of 350,000 g/mol. The polydispersity (Mw/Mn) of the resulting polymer was 1.4. Carbon-13 NMR analysis showed a trans 1,4 polybutadiene content of 75.1%, cis 1,4 polybutadiene content of 18.90%, a 1,2 polybutadiene content of 6%, and a polystyrene content of 15%.

EXAMPLE 2

The procedure described in Example 1 was utilized in this example except that 1 mL of 1 M solution of potassium alkoxide (KOR), i.e., potassium tertiary amylate, in hexanes was added to the catalyst system (BaTHFA/MgR$_2$) making the molar ratio (BaTHFA/MgR$_2$/KOR) 1:3:1. The styrene-butadiene produced was determined to have a glass transition temperature (Tg) at −78° C. and a melting temperature (Tm) at +12° C. The Mooney viscosity (ML-4) at 100° C. was 89. The GPC measurements indicated that the polymer has a number average molecular weight (Mn) of 290,400 g/mol and a weight average molecular weight (Mw) of 370,800 g/mol. The polydispersity (Mw/Mn) of the resulting polymer was 1.28. Carbon-13 NMR analysis showed a trans 1,4 polybutadiene content of 75%, cis 1,4 polybutadiene content of 19%, a 1,2 polybutadiene content of 6%, and a polystyrene content of 15%.

EXAMPLE 3

The procedure described in Example 1 was utilized in this example except that 1 mL of 1 M solution of sodium alkoxide (NaOR), i.e., sodium mentholate, in hexanes and 1 mL of 1 M solution of N,N,N',N'-tetramethylethylene diamine (TMEDA) in hexanes were added to the catalyst system (BaTHFA/MgR$_2$) making the molar ratio (BaTHFA/MgR$_2$/NaOR/TMEDA) 1:3:1:1. The styrene-butadiene produced was determined to have a glass transition temperature (Tg) at −77° C. and a melting temperature (Tm) at +8° C. The Mooney viscosity (ML-4) at 100° C. was 89. The GPC measurements indicated that the polymer has a number average molecular weight (Mn) of 284,600 g/mol and a weight average molecular weight (Mw) of 350,800 g/mol. The polydispersity (Mw/Mn) of the resulting polymer was 1.23. Carbon-13 NMR analysis showed a trans 1,4 polybutadiene content of 74.20%, cis 1,4 polybutadiene content of 19.80%, a 1,2 polybutadiene content of 6%, and a polystyrene content of 18%.

EXAMPLE 4

The procedure described in Example 1 was utilized in this example except that 3 mL of 1 M solution of n-butyl lithium (n-BuLi) in hexanes and 5 mL of 1 M solution of TMEDA in hexanes were added to the catalyst system (BaTHFA/MgR$_2$) making the molar ratio (BaTHFA/MgR$_2$/n-BuLi/TMEDA) 1:3:3:5. The styrene-butadiene produced was determined to have a glass transition temperature (Tg) at −76° C. and a melting temperature (Tm) at −11° C. The Mooney viscosity (ML-4) at 100° C. was 48. The GPC measurements indicated that the polymer has a number average molecular weight (Mn) of 175,000 g/mol and a weight average molecular weight (Mw) of 270,000 g/mol. The polydispersity (Mw/Mn) of the resulting polymer was 1.54. Carbon-13 NMR analysis showed a trans 1,4 polybutadiene content of 75%, cis 1,4 polybutadiene content of 19%, a 1,2 polybutadiene content of 6%, and a polystyrene content of 16.5%.

EXAMPLE 5

The procedure described in Example 1 was utilized in this example except that 3 mL of 1 M solution of n-butyl lithium (n-BuLi) in hexanes was added to the catalyst system (BaTHFA/MgR$_2$) making the molar ratio (BaTHFA/MgR$_2$/n-BuLi) 1:3:3. The styrene-butadiene produced was determined to have a glass transition temperature (Tg) at −79° C. and a melting temperature (Tm) at +5° C. The Mooney viscosity (ML-4) at 100° C. was 89. The GPC measurements indicated that the polymer has a number average molecular weight (Mn) of 270,000 g/mol and a weight average molecular weight (Mw) of 320,000 g/mol. The polydispersity (Mw/Mn) of the resulting polymer was 1.19. Carbon-13 NMR analysis showed a trans 1,4 polybutadiene content of 76%, cis 1,4 polybutadiene content of 18%, a 1,2 polybutadiene content of 6%, and a polystyrene content of 12%.

Accordingly, the solution polymerizations using the above catalyst systems produced styrene-butadiene rubbers having high trans microstructure contents as well as desirable glass transition temperatures, for example. The glass transition temperatures from the above examples indicate low temperature properties. These low temperature properties can translate into rubber compounds with good wearing properties suitable for use in tires. Such rubber compounds may further include 100% silica filler, 100% carbon black filler, or mixtures thereof, for example. The presence of a high trans microstructure content, e.g., greater than 60%, is typically beneficial for providing desirable tearing properties which can give desirable endurance to truck tires, for example. Moreover, such crystallizable high-trans polymers can be useful in building tread rubbers in tire making equipment as a result of lower shrinkage and distortion of the tread compound on extrusion. The Mooney data, for example, indicates a rubbery polymer having better wearing and tearing which can be desirable in medium and heavy truck tires for better chipping and chunking. The polydispersity values indicate a rubbery polymer having a more desirable filler and polymer interaction during processing and calendaring, which can lead to improved fuel economies.

While the present invention has been illustrated by the description of embodiments, and while the illustrative embodiments have been described in considerable detail, it is not the intention of the inventors to restrict or in any way limit the scope of the appended claims to such detail. Additional advantages and modifications readily will appear to those skilled in the art. The invention in its broader aspects is therefore not limited to the specific details, representative apparatus and methods, and illustrative examples shown and described. Accordingly, departures may be made from such details without departing from the scope of the inventors' general inventive concept.

What is claimed is:

1. A catalyst system comprising:
    a barium salt of a primary alcohol which is soluble in a hydrocarbon solvent, the primary alcohol defined by a heterocyclic non-aromatic compound that includes a ring structure with one or more nitrogen atoms or one or more oxygen atoms as part of the ring, the ring structure further substituted by a hydroxy-substituted $C_1$–$C_5$ alkyl group; and
    an organomagnesium compound,
    wherein the catalyst system is devoid of an organoaluminum compound and a lithium alkoxide.

2. The catalyst system of claim 1 wherein the organomagnesium compound is a dialkyl magnesium compound.

3. The catalyst system of claim 1 wherein the primary alcohol is tetrahydrofurfuryl alcohol or furfuryl alcohol.

4. The catalyst system of claim 1 further including an organolithium compound.

5. The catalyst system of claim 4 further including an amine compound.

6. The catalyst system of claim 5 wherein the amine compound is an aliphatic bis-tertiary diamine.

7. The catalyst system of claim 1 further including a group Ia metal alkoxide wherein the group Ia metal is sodium, potassium, rubidium, cesium, or mixtures thereof.

8. The catalyst system of claim 7 further including an amine compound.

9. The catalyst system of claim 8 wherein the amine compound is an aliphatic bis-tertiary diamine.

10. A method comprising:
    polymerizing a conjugated diolefin monomer in the presence of a catalyst system for synthesizing rubbery polymers having a high trans microstructure, the catalyst system comprising:
        a barium salt of a primary alcohol which is soluble in a hydrocarbon solvent, the primary alcohol defined by a heterocyclic non-aromatic compound that includes a ring structure with one or more nitrogen atoms or one or more oxygen atoms as part of the ring, the ring structure further substituted by a hydroxy-substituted $C_1$–$C_5$ alkyl group; and
        an organomagnesium compound,
        wherein the catalyst system is devoid of an organoaluminum compound and a lithium alkoxide.

11. The method of claim 10 wherein polymerizing the conjugated diolefin monomer in the presence of the catalyst system comprises polymerizing at a temperature that is within the range of about 40° C. to about 120° C.

12. The method of claim 10 wherein polymerizing the conjugated diolefin monomer in the presence of the catalyst system comprises copolymerizing styrene with the conjugated diolefin monomer in the presence of the catalyst system.

13. The method of claim 12 wherein the rubbery polymer having a high trans microstructure is styrene-butadiene rubber and wherein the conjugated diolefin monomer is 1,3-butadiene.

14. A catalyst system comprising:
    a barium salt of a primary or secondary alcohol which is soluble in a hydrocarbon solvent;
    a group Ia metal alkoxide wherein the group Ia metal is sodium, potassium, rubidium, cesium, or mixtures thereof; and
    an organomagnesium compound,
    wherein the catalyst system is devoid of an organoaluminum compound and a lithium alkoxide.

15. The catalyst system of claim 14 wherein the organomagnesium compound is a dialkyl magnesium compound.

16. The catalyst system of claim 14 wherein the primary alcohol is tetrahydrofurfuryl alcohol or furfuryl alcohol.

17. The catalyst system of claim 14 further including an organolithium compound.

18. The catalyst system of claim 14 further including an amine compound.

19. The catalyst system of claim 18 wherein the amine compound is an aliphatic bis-tertiary diamine.

* * * * *

UNITED STATES PATENT AND TRADEMARK OFFICE
CERTIFICATE OF CORRECTION

PATENT NO. : 7,291,687 B1
APPLICATION NO. : 11/468921
DATED : November 6, 2007
INVENTOR(S) : Halasa et al.

It is certified that error appears in the above-identified patent and that said Letters Patent is hereby corrected as shown below:

TITLE PAGE, ITEM [73]

Change name of Assignee "The Goodyear Tire and Rubber Company" to --The Goodyear Tire & Rubber Company--.

COLUMN 2

Lines 32-33, change "alcohol (s)" to --alcohol(s)--.

COLUMN 4

Line 53, change "methylcyclohexano" to --methylcyclohexanol--.

COLUMN 4

Line 56, change "pyrrolidinoethanol" to --pyrrolidinoethanol,--.

COLUMN 9

Line 60, change "diamines" to --diamine--.

COLUMN 11

Line 53, before "the barium salts," insert --(a)--.

UNITED STATES PATENT AND TRADEMARK OFFICE
CERTIFICATE OF CORRECTION

PATENT NO.        : 7,291,687 B1
APPLICATION NO.   : 11/468921
DATED             : November 6, 2007
INVENTOR(S)       : Halasa et al.

It is certified that error appears in the above-identified patent and that said Letters Patent is hereby corrected as shown below:

COLUMN 15

Line 6, change "antioxidants" to --antioxidant--.

Signed and Sealed this

Ninth Day of December, 2008

JON W. DUDAS
*Director of the United States Patent and Trademark Office*